United States Patent [19]

Breitweg

[11] Patent Number: 4,774,847
[45] Date of Patent: Oct. 4, 1988

[54] MECHANISM FOR CENTERING RELATIVELY ROTATIVE COMPONENTS, PARTICULARLY IN ROTARY VALVES

[75] Inventor: Werner Breitweg, Schwäbisch Gmünd, Fed. Rep. of Germany

[73] Assignee: Zahnradfabrik Friedrichshafen, AG., Friedrichshafen, Fed. Rep. of Germany

[21] Appl. No.: 66,484

[22] PCT Filed: Oct. 8, 1986

[86] PCT No.: PCT/EP86/00577

§ 371 Date: Jun. 16, 1987

§ 102(e) Date: Jun. 16, 1987

[87] PCT Pub. No.: WO87/02318

PCT Pub. Date: Apr. 23, 1987

[30] Foreign Application Priority Data

Oct. 21, 1985 [WO] PCT Int'l Appl. ........... PCT/ED85/00552

[51] Int. Cl.⁴ .................. B62D 5/06; F16D 3/72
[52] U.S. Cl. .................. 74/388 PS; 91/375 A; 180/132; 267/150; 267/154; 267/273; 464/97
[58] Field of Search .............. 74/388 PS; 91/375 A; 180/132, 141, 142, 143; 267/150, 154, 273; 464/97

[56] References Cited

U.S. PATENT DOCUMENTS

| | | | |
|---|---|---|---|
| 2,906,361 | 9/1959 | Ziskal | 180/79.2 |
| 4,279,323 | 7/1981 | Anod et al. | 74/388 PS X |
| 4,373,598 | 2/1983 | Elser | 180/143 |
| 4,421,010 | 12/1983 | Elser | 91/375 R |
| 4,449,601 | 5/1984 | Adams | 91/375 A X |
| 4,483,237 | 11/1984 | Elser | 91/368 |
| 4,582,086 | 4/1986 | Bacardit | 91/375 A |

FOREIGN PATENT DOCUMENTS

| | | |
|---|---|---|
| 32345 | 7/1981 | European Pat. Off. . |
| 1205624 | 2/1960 | France . |
| 2388709 | 11/1978 | France . |
| 2913484 | 10/1980 | Fed. Rep. of Germany . |
| WO87/02318 | 4/1987 | Int'l Pat. Institute . |
| WO87/04678 | 8/1987 | Int'l Pat. Institute . |
| 832559 | 4/1960 | United Kingdom . |

Primary Examiner—Allan D. Herrmann
Attorney, Agent, or Firm—Zalkind & Shuster

[57] ABSTRACT

Rotary pressure control valves in booster steering systems are rotated by manual force at the steering wheel against a return force, usually a steel torque rod which is twisted by rotation of the steering wheel. Upon release of steering force, the untwisting of the rod causes reverse rotation toward neutral shut-off, i.e., centered position, so that coacting pressure channels of relatively rotated valve components are closed. Such reverse rotation is effected herein with the aid of a metal bellows which is compressed by cam operation during twisting of the torque rod. Upon untwisting, the bellows expands and acts through the cam to exert a reverse rotary force on the valve components to effect complete centering. Upon reaching centered valve position, the cam serves as a detent to hold the centered position of the valve components.

12 Claims, 1 Drawing Sheet

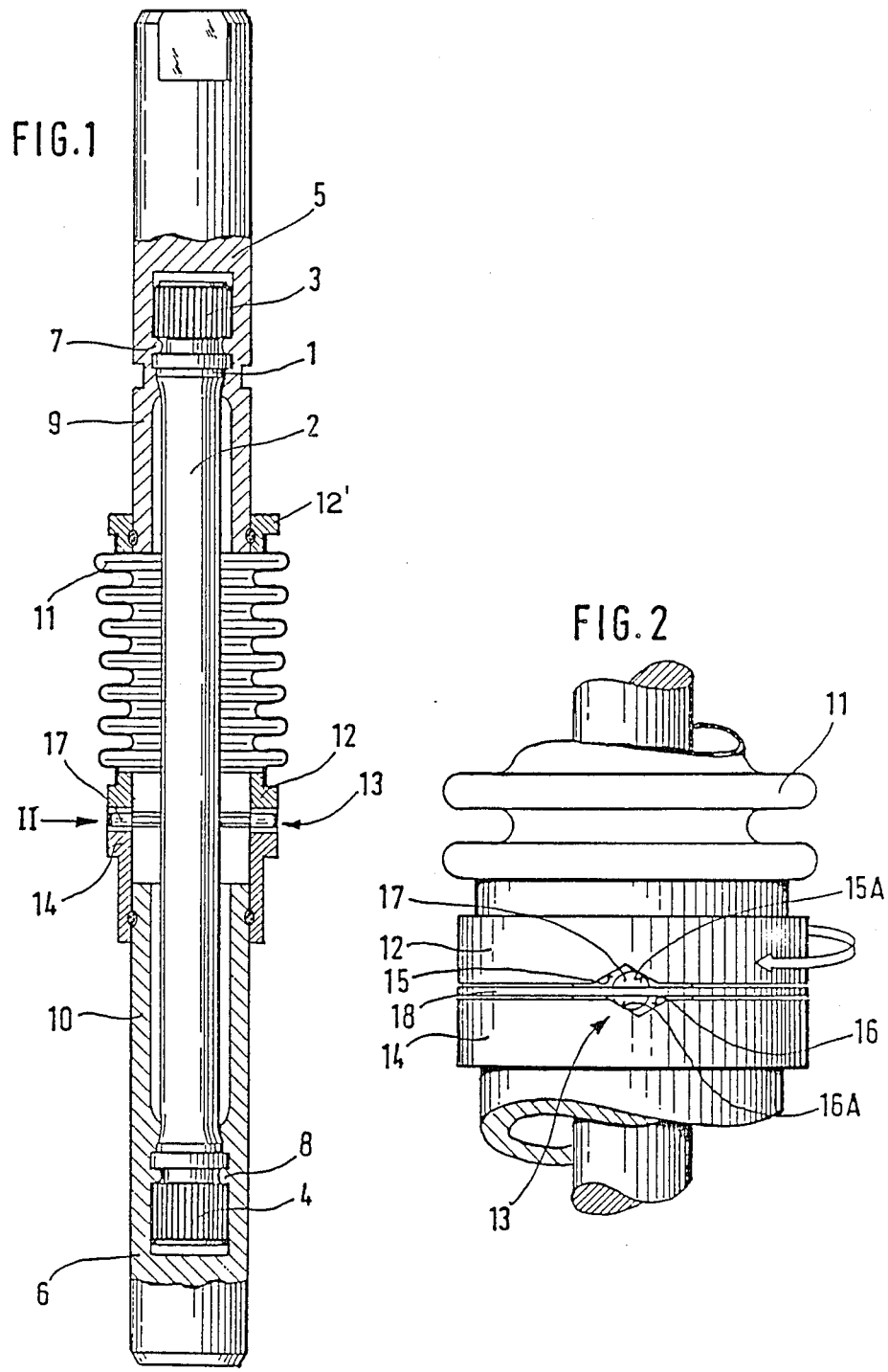

MECHANISM FOR CENTERING RELATIVELY ROTATIVE COMPONENTS, PARTICULARLY IN ROTARY VALVES

BACKGROUND OF THE INVENTION

In rotating valves having torque rods, as shown in the international application, EP No. 0032345, the return untwisting of the rod does not always bring the rotary component of the valve to the centered initial neutral position. Reliance on exact return to an initial position of the untwisting movement of the torque rod is not possible due to the characteristics of such rods.

THE PRESENT INVENTION

The invention herein overcomes the problem by effecting complete return with an auxiliary spring in the form of a bellows which is compressed during torsional stress of the torque rod but expands when stress is released to aid in the force exerted by the torque rod for centering the relatively rotative components to an exact position.

Thus, stressing the torque rod, e.g., by manual rotation of a steering wheel, operates a cam means comprising V-shaped notches or crevices in the opposed edges of sleeves secured to opposite ends of the torque rod which sleeves then have relative rotative movement causing rollers within the notches to ride up the slanted notch edges effecting a compression of the bellows.

Upon release of steering force on the torque rod, the bellows expands to add the stored force therein to the untwisting force of the torque rod up to the point where the rollers rest in the crevices of the V-notches which effect a detent for holding the relatively rotative valve components in a centered position.

The combining of a torque rod with a torsionally stiff metal bellows which has axial spring action has the advantage of large centering force of a torque rod for large angles of relative rotation as well as the advantage of an exact centered position for small angles by way of the cam detent. Further, when the invention is used in a steering system of the power boost type, an improved driving touch or feel is achieved combined with a torque rod. The combined components of the invention require no more space than conventional arrangements of the kind that use only a torque rod since all novel components encompass the torque rod with due clearance so as to be free of friction while the cam means is nearly friction free while effecting a precise initial position for the relatively rotating parts. Additionally, as will be seen, the encompassing of the torque rod by the bellows and connecting parts to be described, the torque rod is protected from damage in its placement and maintenance in the assembly.

A detailed description of the invention now follows, wherein

FIG. 1 is a longitudinal section through the overall assembly, and

FIG. 2 is an enlarged exterior view of the cam means assembly.

Referring to the Figures of the drawing, the invention has a torque rod 1 which is narrowed in cross section at the central area 2 wherein the ends of the torque rod 1 have knurled portions 3 and 4 of larger diameter. Such portions 3 and 4 have surfaces knurling for gripping within respective rod end housings 5 and 6. Surface profiling between components 5 and 6 and respective portions 3 and 4 may be round kneading, hammering, or similar deformation. Respective grooves 7 and 8 are provided in respective ends 3 and 4 so as to secure the torque rod end housings 5 and 6, respectively, against any axial looseness on the torque rod 1.

The housings 5 and 6 will be understood to connect between a torque drive, for example, a steering wheel (not shown) at the upper end, and a rotary valve rotative element at the lower end (not shown), all in a conventional manner.

The torque rod housings, 5 and 6, have respective free end extensions 9 and 10 extending along the shank 2 of torque rod 1, surrounding the torque rod 1 but spaced therefrom.

At the free end 9 of the torque rod housing 5, a torsionally stiff metal bellows 11 is attached which is capable of compressibility and expansion with no significant twisting. This bellows 11 encompasses the torque rod 1 around the torsional length 2. The other end of the metal bellows 11 carries a sleeve 12 secured thereto.

The bellows is secured to extension 9 by means comprising spot welding to an intermediate sleeve 12', as shown in FIG. 1, between the bellows and extension 9. Sleeve 12 is notched for diametrically disposed detent cam means 13 for fixing the position in return movement during untwisting of the torque rod to an exact centering of relative rotative elements, e.g., of a booster steering valve. The detent cam means also comprises a notched sleeve 14, spot welded to extension 10. Cam means 13 has a centering position afforded by the notched sleeves 12 and 14 which carry by way of the notching on each side, V-shaped crevices formed by slanted edges 15, 15A, 16, 16A, as clearly shown in FIG. 2 for one of the cam means.

Thus, the crevices are centering detents on the edges of the sleeves 12 and 14. In other to reduce the friction of the cam means 13 which serves as a centering detent for the final untwisting movement of the torque rod, rollers 17 are provided locking into the crevices of slanted edges 15, 15A, 16, 16A, and being carried in roller cage 18.

In the event of torsional stress, e.g., in the arrow direction (FIG. 2) between the torque rod housings 5 and 6, the crevice edges 15 and 16 are separated due to relative rotative movement of the sleeves 12 and 14, as will be apparent.

Accordingly, the slanted cam surfaces 15A and 16A are forced apart axially by rollers 17, clearly understandable from FIG. 2. Such axial relative movement of cam surfaces 15A and 16A causes compression of the metal bellows 11 and an axial force results between the cam surfaces 15A and 16A and roller 17. This is a stored force by virtue of bellows compression. Upon release of torsional stress on the torque rod, the untwisting of the torque rod causes axial movement towards each other of the sleeves. Thus, the permitted expansion of the bellows is relied on to complete such centering movement acting through the cam surfaces 15A and 16A until the ultimate centering is reached with the rollers locked in the crevices, a detent effected by the slanted surfaces and the rollers.

We claim:

1. A mechanism particularly for booster steering rotary valves for return of relatively rotatable valve components to an initial position wherein a torque rod (2) has ends (3, 4) fixedly connected to respective relatively rotatable components (5, 6) to be torsionally stressed by rotation of one of said rotatable components (5) for effecting return toward said initial position of said valve components when said torsional stress is released;

the improvement wherein a compressible, spring-like, torsionally stiff bellows (11) is secured to one said rotatable component (5) and encompasses said torque rod;

a cam means (13) between said relatively rotatable components (5, 6) operative to compress said bellows when said one component (5) is rotated in torsionally stressing said torque rod; whereby upon permitting said torque rod to untwist for restoring said valve components toward initial position said cam means permits the expansion of said bellows to aid in restoring said valve components through said cam means to a fully centered position.

2. A mechanism as set forth in claim 1, wherein said torque rod is narrowed in the length of its twistable cross section.

3. A mechanism as set forth in claim 1, wherein said relatively rotatable components (5, 6) encompass said torque rod and extend to effect housings for respective ends of said torque rod; said cam means comprising a crevice means (15, 15A) of said one rotatable component (5) and opposing a crevice means (16, 16A) of said other rotatable component (6); said crevice means each comprising V-shaped slanting sides; a roller means (17) between said crevice means to effect a detent in said crevice means when said valve components have reached a centered position upon expansion of said bellows.

4. A mechanism as set forth in claim 3, said crevice means comprising respective sleeves (12, 14) secured to said bellows and to said other rotatable component (6) and said sleeves having opposed radial edges with respective crevice means notched therein.

5. A mechanism as set forth in claim 4, wherein said crevice means and roller means are provided in plurality of said radial edges.

6. A mechanism as set forth in claim 5, wherein said roller means comprises a plurality of rollers carried in a roller cage (18) disposed intermediate said radial edges.

7. A mechanism as set forth in claim 4, wherein the bellows is secured to one extension (9) and to the respective sleeve (12) by spot welding; and the other extension (10) is secured to the respective sleeve (14) by spot welding.

8. A mechanism as set forth in claim 2, wherein said torque rod is narrowed in the length of its twistable cross section; wherein said relatively rotatable components (5, 6) encompass said torque rod and extend to effect housings for respective ends of said torque rod; said cam means comprising a crevice means (15, 15A) of said one rotatable component (5) and opposing a crevice means (16, 16A) of said other rotatable component (6); said crevice means each comprising V-shaped slanting sides; a roller means (17) between said crevice means to effect a detent in said crevice means when said valve components have reached a centered position upon expansion of said bellows.

9. A mechanism as set forth in claim 8, said crevice means comprising respective sleeves (12, 14) secured to said bellows and to said other rotatable component (6) and said sleeves having opposed radial edges with respective crevice means notched therein.

10. A mechanism as set forth in claim 8, wherein said crevice means and roller means are provided in plurality for said radial edges.

11. A mechanism as set forth in claim 8, wherein said roller means comprises a plurality of rollers carried in a roller cage (18) disposed intermediate said radial edges.

12. A mechanism as set forth in claim 9, wherein one end of the bellows is secured to one extension (9) through an intermediate sleeve (12') spot welded to extension 9, and the other extension 10 is spot welded to respective sleeve 14.

* * * * *